United States Patent
Lee

(10) Patent No.: US 9,480,059 B2
(45) Date of Patent: Oct. 25, 2016

(54) METHOD OF INDICATING DOWNLINK CONTROL CHANNEL AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 147 days.

(21) Appl. No.: 13/917,618

(22) Filed: Jun. 13, 2013

(65) Prior Publication Data

US 2013/0336253 A1 Dec. 19, 2013

Related U.S. Application Data

(60) Provisional application No. 61/659,985, filed on Jun. 15, 2012.

(51) Int. Cl.
*H04W 72/04* (2009.01)
*H04L 5/00* (2006.01)

(52) U.S. Cl.
CPC .......... *H04W 72/042* (2013.01); *H04L 5/0053* (2013.01)

(58) Field of Classification Search
CPC ..... H04L 5/001; H04L 5/003; H04L 5/0053; H04L 5/0007
USPC ........................................ 370/329, 328, 468
See application file for complete search history.

(56) References Cited

U.S. PATENT DOCUMENTS

| 8,280,389 | B1 | 10/2012 | Turtinen |
| 8,843,168 | B2 | 9/2014 | Wang |
| 2009/0252075 | A1* | 10/2009 | Ji .......................... H04W 56/00 370/312 |
| 2009/0252077 | A1* | 10/2009 | Khandekar et al. .......... 370/312 |

(Continued)

FOREIGN PATENT DOCUMENTS

| CN | 102238692 A | 11/2011 |
| CN | 102792616 A | 11/2012 |

(Continued)

OTHER PUBLICATIONS

Huawei, Hisilicon, Considerations on the ePDCCH design, 3GPP TSG RAN WG1 Meeting #67, R1-113655, Nov. 14-18, 2011, XP050561796, San Francisco, USA.

(Continued)

*Primary Examiner* — Dang Ton
*Assistant Examiner* — Sai Aung
(74) *Attorney, Agent, or Firm* — Winston Hsu; Scott Margo

(57) ABSTRACT

A method of indicating a downlink (DL) control channel for a network of a wireless communication system method comprises configuring an enhanced physical control format indicator channel (ePCFICH) according to an amount of resource for transmitting an enhanced physical DL control channel (ePDCCH) of a subframe, wherein the ePDCCH is dedicate to a communication device of the wireless communication system or to a group to which the communication device belongs; and transmitting the ePCFICH to the communication device via a plurality of bits of a physical hybrid automatic repeat request (HARQ) indicator channel (PHICH) of the subframe, to indicate the amount of resource for transmitting the ePDCCH to the communication device.

8 Claims, 6 Drawing Sheets

(56) References Cited

U.S. PATENT DOCUMENTS

| | | | |
|---|---|---|---|
| 2009/0259909 A1* | 10/2009 | Luo | H04L 1/0038 714/748 |
| 2009/0290597 A1* | 11/2009 | Baumgartner et al. | 370/468 |
| 2010/0172318 A1* | 7/2010 | Zhu | H04J 13/00 370/330 |
| 2010/0309865 A1 | 12/2010 | Kimura | |
| 2011/0044391 A1* | 2/2011 | Ji | H04L 5/0007 375/260 |
| 2011/0170496 A1 | 7/2011 | Fong | |
| 2011/0249633 A1 | 10/2011 | Hong | |
| 2011/0269492 A1* | 11/2011 | Wang | 455/509 |
| 2011/0312328 A1 | 12/2011 | Choi | |
| 2012/0044821 A1* | 2/2012 | Kim et al. | 370/252 |
| 2012/0054258 A1 | 3/2012 | Li | |
| 2012/0063321 A1 | 3/2012 | Chandrasekhar | |
| 2012/0120891 A1 | 5/2012 | Mazzarese | |
| 2012/0149413 A1 | 6/2012 | Pedersen | |
| 2012/0230272 A1 | 9/2012 | Kim | |
| 2012/0263117 A1* | 10/2012 | Love | H04L 5/003 370/329 |
| 2012/0269151 A1* | 10/2012 | Lee et al. | 370/329 |
| 2013/0021984 A1* | 1/2013 | Han | H04W 74/006 370/329 |
| 2013/0039284 A1* | 2/2013 | Marinier | H04L 5/001 370/329 |
| 2013/0094456 A1 | 4/2013 | Ng | |
| 2013/0107816 A1* | 5/2013 | Iraji et al. | 370/329 |
| 2013/0182583 A1 | 7/2013 | Siomina | |
| 2013/0301608 A1 | 11/2013 | Frenne | |
| 2014/0003271 A1 | 1/2014 | Abe | |
| 2014/0086189 A1 | 3/2014 | Takeda | |

FOREIGN PATENT DOCUMENTS

| | | | |
|---|---|---|---|
| WO | 2011036986 A1 | 3/2011 | |
| WO | WO 2013173967 A1 * | 5/2012 | 370/329 |

OTHER PUBLICATIONS

Motorola Mobility, EPDCCH Design Aspects, 3GPP TSG RAN WG1 Meeting #68bis, R1-121583, Mar. 26-30, 2012, pp. 1-3, XP050599847, Jeju, Korea.

Apple Inc., On the Structure and Usage Scenarios of ePDCCH, 3GPP TSG RAN WG1 Meeting #67, R1-114300, Nov. 14-18, 2011, pp. 1-9, XP050562351, San Francisco, USA.

Texas Instruments, On multiplexing of ePDCCH with PDSCH, 3GPP TSG RAN WG1 Meeting #67, R1-113792, Nov. 14-18, 2011, pp. 1-4, XP050561887, San Francisco, USA.

Fujitsu, Motivation, Requirements and Design for ePCFICH, 3GPP TSG RAN WG1 Meeting #69, R1-122074, May 21-25, 2012, pp. 1-4, XP050600363, Prague, Czech Republic.

Samsung, ePHICH design for Rel-11, 3GPP TSG RAN WG1 Meeting #69, R1-122258, May 21-25, 2012, pp. 1-5, XP050600521, Prague, Czech Republic.

Samsung, Enhanced PCFICH, 3GPP TSG RAN WG1 #69, R1-122261, May 21-25, 2012, pp. 1-4, XP050600524, Prague, Czech Republic.

* cited by examiner

METHOD OF INDICATING DOWNLINK CONTROL CHANNEL AND RELATED COMMUNICATION DEVICE

CROSS REFERENCE TO RELATED APPLICATIONS

This application claims the benefit of U.S. Provisional Application No. 61/659,985, filed on Jun. 15, 2012 and entitled "Method and Apparatus to Improve Control Channel Capacity", the contents of which are incorporated herein in their entirety.

BACKGROUND OF THE INVENTION

1. Field of the Invention

The present invention relates to a method used in a wireless communication system and related communication device, and more particularly, to a method of indicating a downlink control channel and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

However, a location of the DL control channel is fixed. It is not flexible for the network to indicate various resources of the subframes, the component carriers or configurations the UE. Thus, a method for indicating the DL control channel flexibly is needed, and is an important topic to be discussed.

SUMMARY OF THE INVENTION

The present invention therefore provides a method and related communication device for indicating a downlink control channel to solve the abovementioned problem.

A method of indicating a downlink (DL) control channel for a network of a wireless communication system method comprises configuring an enhanced physical control format indicator channel (ePCFICH) according to an amount of resource for transmitting an enhanced physical DL control channel (ePDCCH) of a subframe, wherein the ePDCCH is dedicate to a communication device of the wireless communication system or to a group to which the communication device belongs; and transmitting the ePCFICH to the communication device via a plurality of bits of a physical hybrid automatic repeat request (HARQ) indicator channel (PHICH) of the subframe, to indicate the amount of resource for transmitting the ePDCCH to the communication device.

A method of indicating a downlink (DL) control channel for a network of a wireless communication system comprises configuring an enhanced physical control format indicator channel (ePCFICH) according to an amount of resource for transmitting an enhanced physical DL control channel (ePDCCH) of a subframe, wherein the ePDCCH is dedicate to a communication device of the wireless communication system or to a group to which the communication device belongs; and transmitting the ePCFICH to the communication device in at least one of a punctured part of a physical DL control channel (PDCCH) and a puncture part of a physical DL shared channel (PDSCH) of the subframe, to indicate the amount of the resource for transmitting the ePDCCH to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
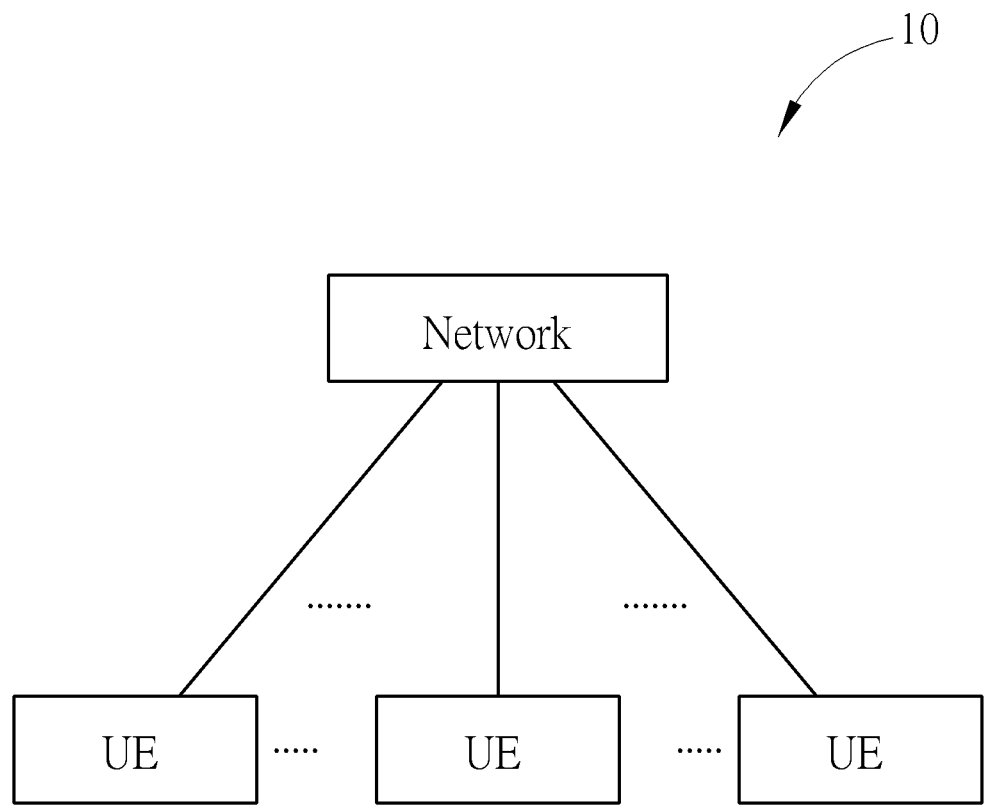
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system. In one example, the network and the UEs may support carrier aggregation (CA), and a UE can communicate with the network via multiple component carriers according to the CA.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to direction, e.g., for an uplink (UL), the UE is the transmitter and the network is the receiver, and for a downlink (DL), the network is the transmitter and the UE is the receiver.

Figure 2:
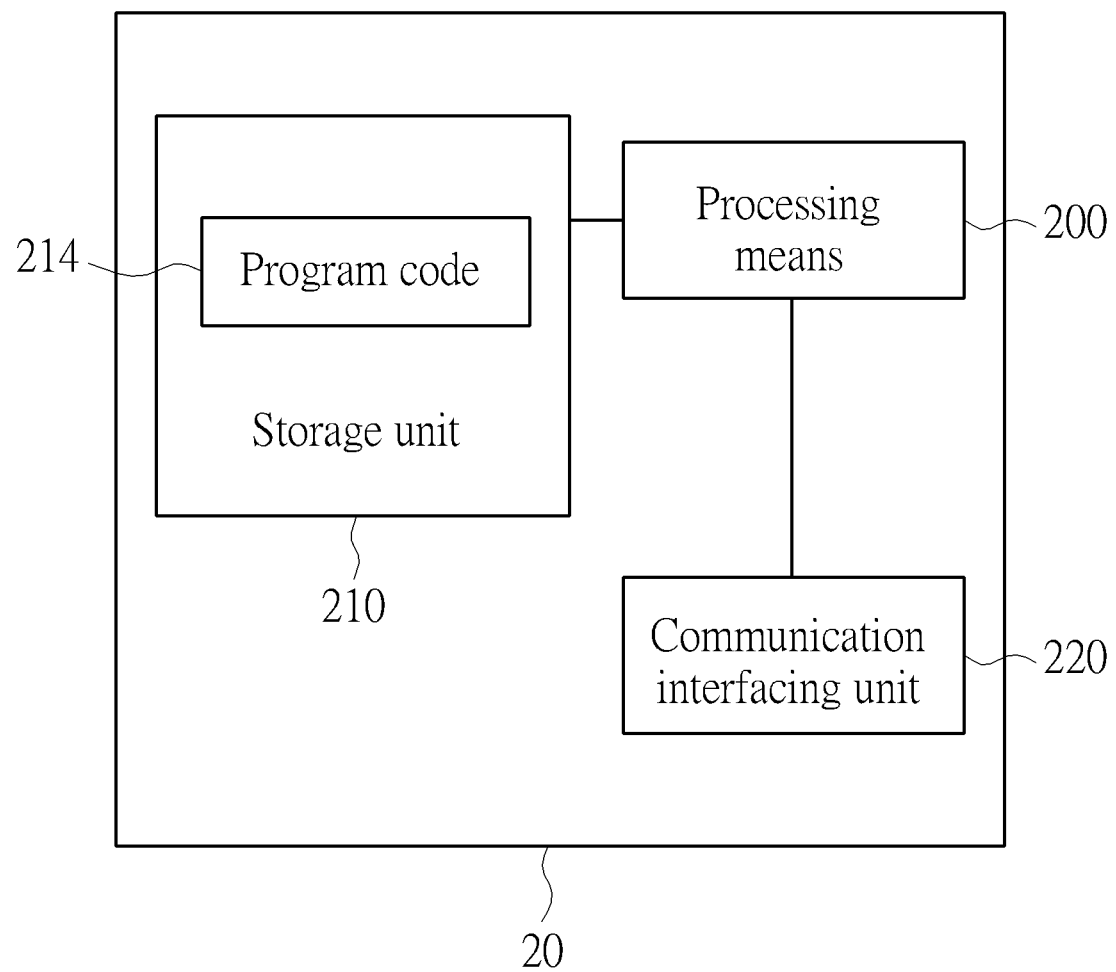
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
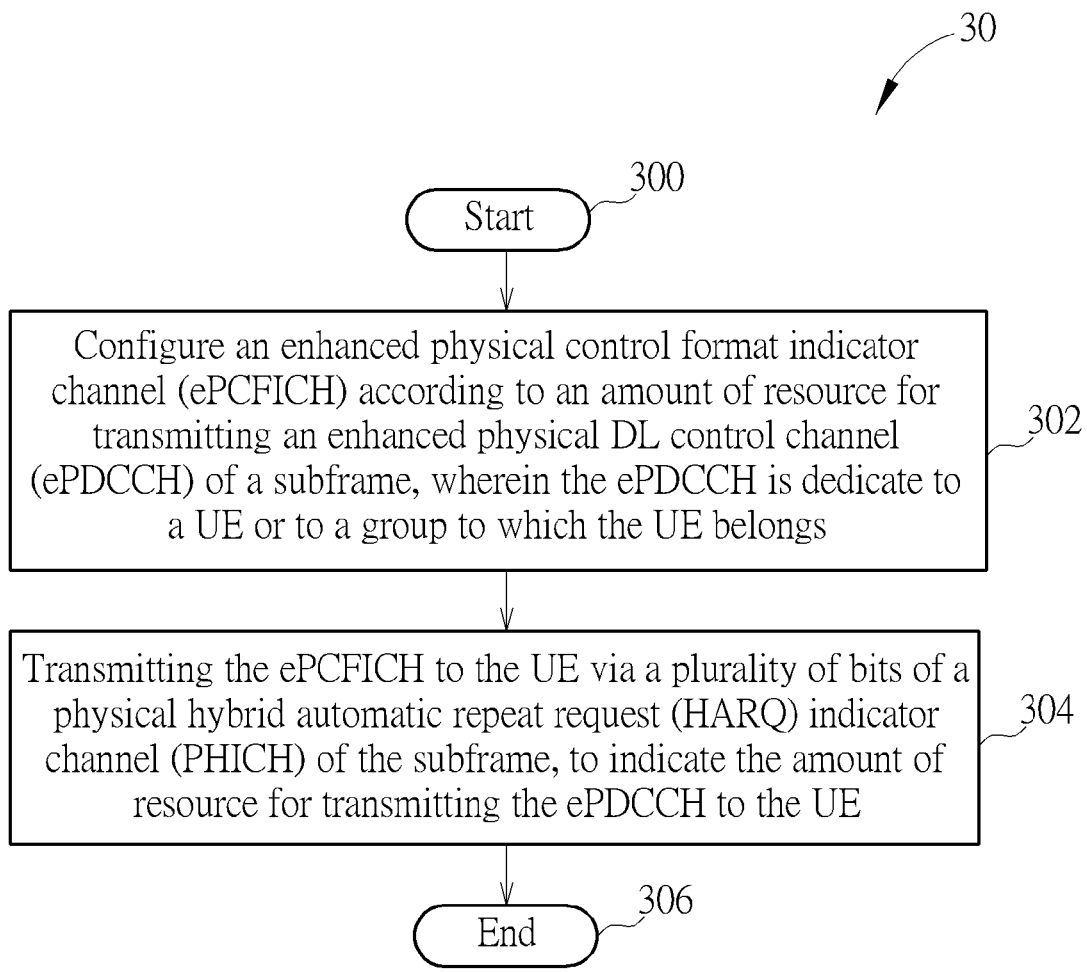
FIG. 3 is a flowchart of a process according to an example of the present invention.

Please refer to FIG. 3, which is a flowchart of a process 30 according to an example of the present invention. The process 30 can be utilized in the network shown in FIG. 1, for indicating a DL control channel. The process 30 may be compiled into the program code 214 and includes the following steps:

Step 300: Start.

Step 302: Configure an enhanced physical control format indicator channel (ePCFICH) according to an amount of resource for transmitting an enhanced physical DL control channel (ePDCCH) of a subframe, wherein the ePDCCH is dedicate to a UE or to a group to which the UE belongs.

Step 304: Transmitting the ePCFICH to the UE via a plurality of bits of a physical hybrid automatic repeat request (HARQ) indicator channel (PHICH) of the subframe, to indicate the amount of resource for transmitting the ePDCCH to the UE.

Step 306: End.

According to the process 30, the network first configures an ePCFICH according to an amount of resource for transmitting an ePDCCH of a subframe, wherein the ePDCCH is dedicate to a UE or to a group to which the UE belongs. Then, the network transmits the ePCFICH to the UE via a plurality of bits of a PHICH of the subframe, to indicate the amount of resource for transmitting the ePDCCH to the UE. That is, the ePDCCH which may be UE-specific or UE group-specific can be indicated by using the ePCFICH, and the ePCFICH is transmitted via the resource of the PHICH.

Thus, the ePDCCH can be arranged and indicated flexibly.

Realization of the process 30 is not limited. For example, the amount of resource can be a number of resource blocks (RBs) or a number of resource block groups (RBGs). On the other hand, the location of the plurality of bits of the PHICH can be determined according to a cell-specific identifier, a subframe index of the subframe, a DL system bandwidth of the wireless communication system, system information, a UE-specific signaling and/or a UE group-specific signaling. In another example, the location can be predetermined. In short, the location can be determined flexibly. In addition, the plurality of bits of the PHICH can be encoded according to a code division multiplexing (CDM) rule of the PHICH. In other words, the plurality of bits for transmitting the ePCFICH can be multiplexed with other bits for transmitting the PHICH according to the same CDM rule, while the meaning of the bits for transmitting the ePCFICH and the PHICH can be different.

Figure 4:
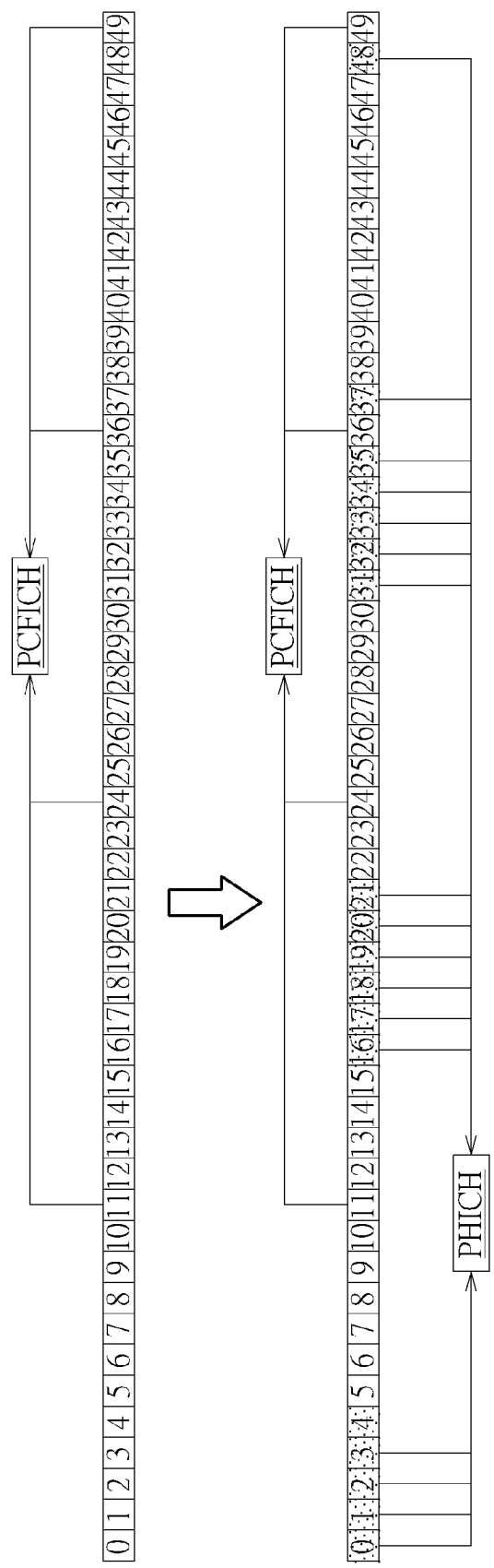
FIG. 4 is a schematic diagram of resource allocation according to an example the present invention.

Please refer to FIG. 4, which is a schematic diagram of resource allocation according to an example the present invention. In FIG. 4, 50 resource element groups (REGs) 0-49 are considered. In detail, a PCFICH is arranged in the REGs 11, 24, 36 and 49, and a PHICH channel is arranged in the REGs 0-4, 16-21, 31-35, 37 and 48. The rest of the REGs can be used for carrying a PDCCH, and is not limited herein. According to the process 30, part of the REGs 0-4, 16-21, 31-35, 37 and 48 (e.g., the REGs 16, 31 and 48) can be used for arranging the ePCFICH. For example, 8 UEs may share the REGs 16, 31 and 48. That is, the network transmits HARQ information to the 8 UEs via the REGs 16, 31 and 48, wherein bits of the HARQ information are multiplexed and arranged in the REGs 16, 31 and 48. According to the process 30, the network may transmit the ePCFICH to the first UE by using several bits of the REGs 16, 31 and 48. After the first UE receives the REGs 16, 31 and 48, the first UE can demultiplex the REGs 16, 31 and 48 according to the CDM rule of the PHICH, and interpret the bits belonging to it according to the rule for the ePCFICH.

On the other hand, when coordinated multipoint (CoMP) transmission/reception is operated by the network and the UE, i.e., multiple transmission points communicate the UE, the ePCFICH and the ePDCCH may be transmitted by different transmission points. For example, a first transmission point transmits the ePCFICH to the UE, and a second transmission point transmits the ePDCCH to the UE. When carrier aggregation (CA) is operated by the network and the UE, i.e., the network communicates the UE via multiple component carriers, the ePCFICH and the ePDCCH may be transmitted via different component carriers.

Figure 5:
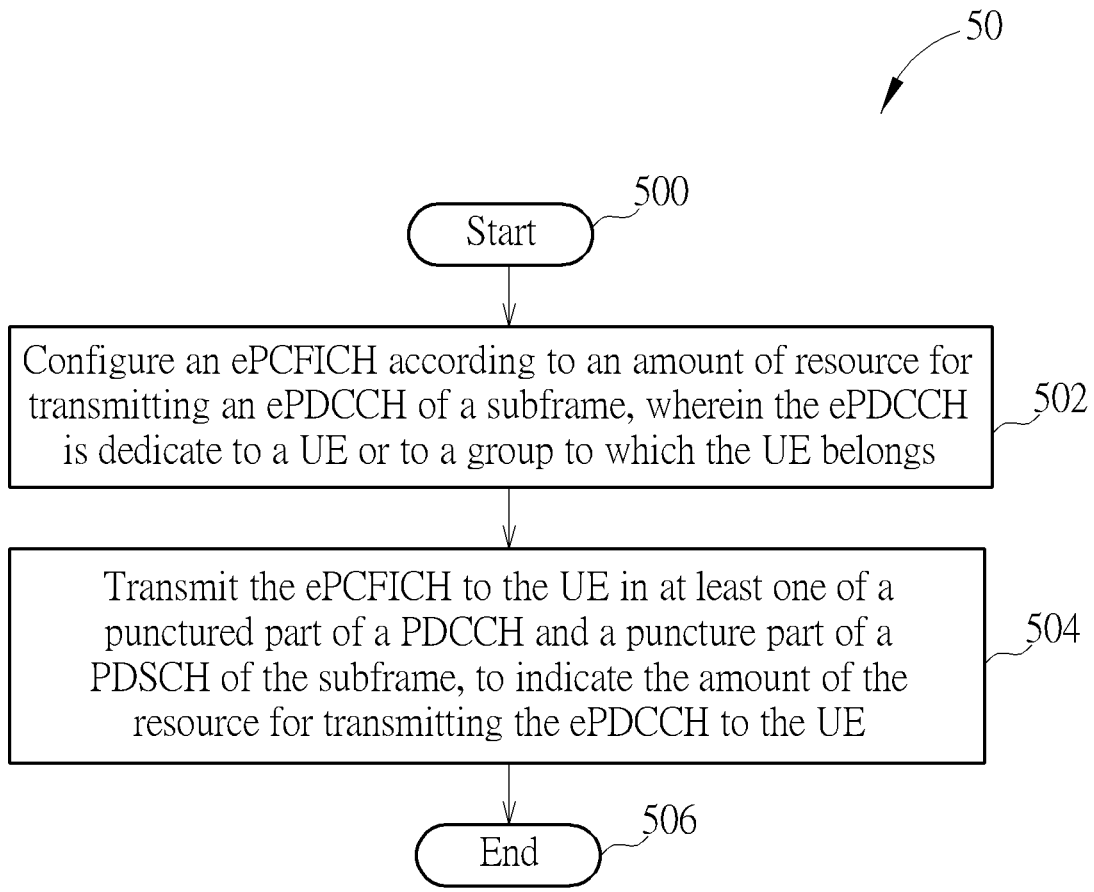
FIG. 5 is a flowchart of a process according to an example of the present invention.

Please refer to FIG. 5, which is a flowchart of a process 50 according to an example of the present invention. The process 50 can be utilized in the network shown in FIG. 1, for indicating a DL control channel. The process 50 may be compiled into the program code 214 and includes the following steps:

Step 500: Start.

Step 502: Configure an ePCFICH according to an amount of resource for transmitting an ePDCCH of a subframe, wherein the ePDCCH is dedicate to a UE or to a group to which the UE belongs.

Step 504: Transmit the ePCFICH to the UE in at least one of a punctured part of a PDCCH and a puncture part of a PDSCH of the subframe, to indicate the amount of the resource for transmitting the ePDCCH to the UE.

Step 506: End.

According to the process 50, the network configures an ePCFICH according to an amount of resource for transmitting an ePDCCH of a subframe, wherein the ePDCCH is dedicate to a UE or to a group to which the UE belongs. Then, the network transmits the ePCFICH to the UE in at least one of a punctured part of a PDCCH and a puncture part of a PDSCH of the subframe, to indicate the amount of the resource for transmitting the ePDCCH to the UE. That is, the PDCCH and/or the PDSCH is punctured (i.e., overwritten) by using the ePCFICH, to indicate the ePDCCH which may be UE-specific or UE group-specific. Since an amount of the punctured part of the PHICH can be controlled, the UE can still detect (e.g., receive, demodulate and/or decode) the PDCCH and/or the PDSCH correctly. Thus, the ePDCCH can be arranged and indicated flexibly.

Realization of the process 50 is not limited. For example, the amount of resource can be a number of RBs or a number of RBGs. On the other hand, the punctured part of the PDCCH can be determined according to a cell-specific identifier, a subframe index of the subframe, a DL system bandwidth of the wireless communication system, system information, a UE-specific signaling and/or a UE group-specific signaling. Similarly, the punctured part of the PDSCH can be determined according to a cell-specific identifier, a subframe index of the subframe, a DL system bandwidth of the wireless communication system, system information, a UE-specific signaling and/or a UE group-specific signaling. In another example, the punctured part of the PDSCH can be determined according at least one of system information, a UE-specific signaling and a UE group-specific signaling. In another example, the punctured part of the PDCCH or the PDSCH can be predetermined. In short, the punctured part of the PDCCH or the PDSCH can be determined flexibly.

Figure 6:
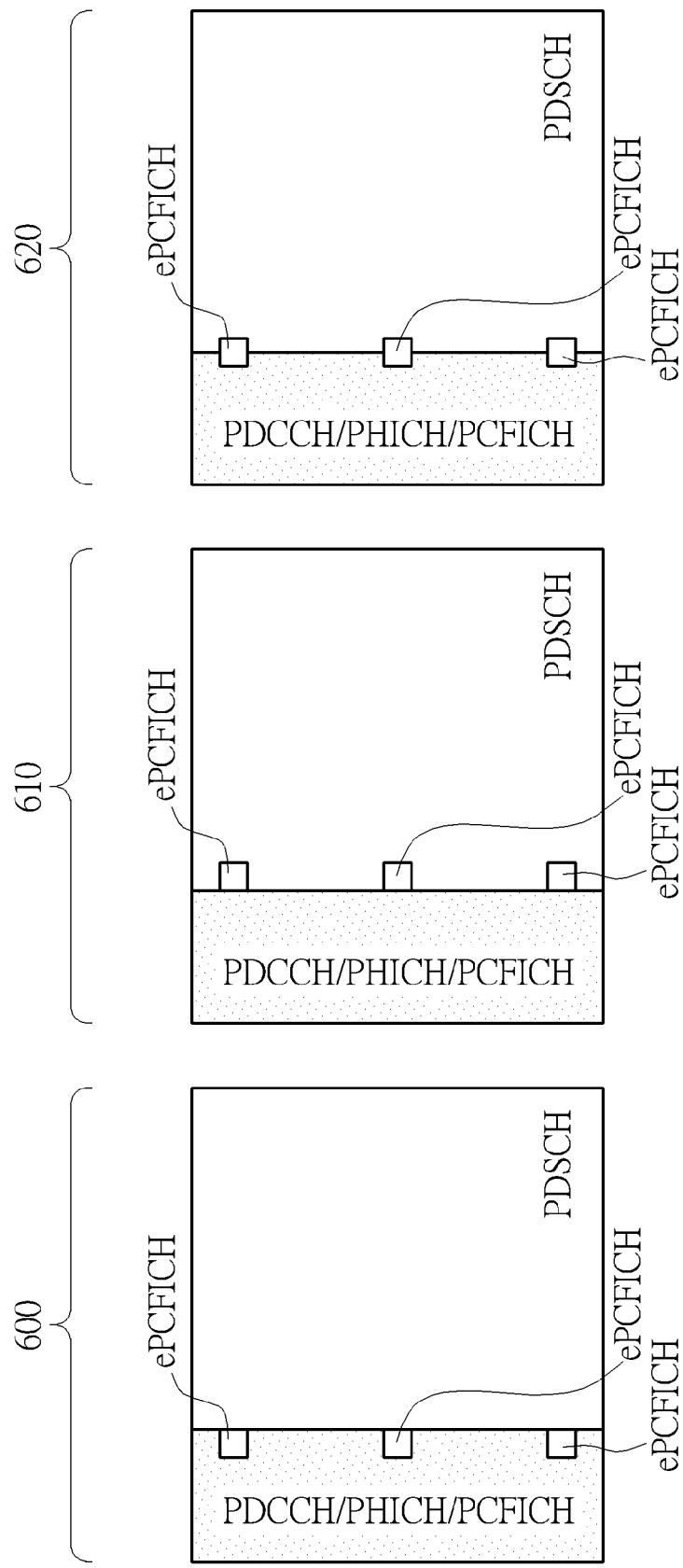
FIG. 6 is a schematic diagram of arrangements of the ePCFICH according to an example of the present invention.

Please refer to FIG. 6, which is a schematic diagram of arrangements of the ePCFICH according to an example of the present invention. Three DL subframe 600, 610 and 620 are shown in FIG. 6, and are used for illustrating three different arrangements of the ePCFICH, respectively. In the DL subframe 600, the PDCCH is punctured for transmitting the ePCFICH. In the DL subframe 610, the PDSCH is punctured for transmitting the ePCFICH. In the DL subframe 620, both the PDCCH and the PDSCH are punctured for transmitting the ePCFICH.

On the other hand, when CoMP transmission/reception is operated by the network and the UE, i.e., multiple transmission points communicate the UE, the ePCFICH and the ePDCCH may be transmitted by different transmission points. For example, a first transmission point transmits the ePCFICH to the UE, and a second transmission point transmits the ePDCCH to the UE. When CA is operated by the network and the UE, i.e., the network communicates the UE via multiple component carriers, the ePCFICH and the ePDCCH may be transmitted via different component carriers.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for indicating a DL control channel (e.g., the ePDCCH). Since the ePCFICH can be dynamically arranged, the ePDCCH can be arranged and indicated flexibly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of indicating a downlink (DL) control channel for a network of a wireless communication system, the method comprising:
   configuring an enhanced physical control format indicator channel (ePCFICH) according to an amount of resource for transmitting an enhanced physical DL control channel (ePDCCH) of a subframe, wherein the ePDCCH is dedicate to a communication device of the wireless communication system or to a group to which the communication device belongs; and
   transmitting the ePCFICH to the communication device via a plurality of bits of a physical hybrid automatic repeat request (HARQ) indicator channel (PHICH) of the subframe, to indicate the amount of resource for transmitting the ePDCCH to the communication device;
   wherein the plurality of bits of the PHICH is encoded according to a code division multiplexing (CDM) rule of the PHICH;
   wherein a location of the plurality of bits of the PHICH is determined according to at least one of a cell-specific identifier, a subframe index of the subframe, a DL system bandwidth of the wireless communication system, system information, a UE-specific signaling and a UE group-specific signaling; and
   wherein a location of the plurality of bits of the ePDCCH is determined according to at least one of a cell-specific identifier, a subframe index of the subframe, a DL system bandwidth of the wireless communication system, system information, a UE-specific signaling and a UE group-specific signaling.

2. The method of claim 1, wherein the amount of resource is a number of resource blocks (RBs) or a number of resource block groups (RBGs).

3. The method of claim 1, wherein the ePCFICH is transmitted by a first transmission point of the network, and the ePDCCH is transmitted by a second transmission point of the network.

4. The method of claim 1, wherein the ePCFICH is transmitted by the network via a first component carrier, and the ePDCCH is transmitted by the network via a second component carrier.

5. A method of indicating a downlink (DL) control channel for a network of a wireless communication system, the method comprising:
   configuring an enhanced physical control format indicator channel (ePCFICH) according to an amount of resource for transmitting an enhanced physical DL control channel (ePDCCH) of a subframe, wherein the ePDCCH is dedicate to a communication device of the wireless communication system or to a group to which the communication device belongs; and transmitting the ePCFICH to the communication device in at least one of a punctured part of a physical DL control channel (PDCCH) and a puncture part of a physical DL shared channel (PDSCH) of the subframe, to indicate the amount of the resource for transmitting the ePDCCH to the communication device;

wherein the punctured part of the PDCCH is determined according to at least one of a cell-specific identifier, a subframe index of the subframe, a DL system bandwidth of the wireless communication system, system information, a UE-specific signaling and a UE group-specific signaling;

wherein the punctured part of the PDSCH is determined according to at least one of a cell-specific identifier, a subframe index of the subframe, a DL system bandwidth of the wireless communication system, system information, a UE-specific signaling and a UE group-specific signaling.

6. The method of claim 5, wherein the amount of resource is a number of resource blocks (RBs) or a number of resource block groups (RBGs).

7. The method of claim 5, wherein the ePCFICH is transmitted by a first transmission point of the network, and the ePDCCH is transmitted by a second transmission point of the network.

8. The method of claim 5, wherein the ePCFICH is transmitted by the network via a first component carrier, and the ePDCCH is transmitted by the network via a second component carrier.

* * * * *